United States Patent [19]

Sprague et al.

[11] 4,409,479
[45] Oct. 11, 1983

[54] OPTICAL CURSOR CONTROL DEVICE

[75] Inventors: Robert A. Sprague, Saratoga; Donald R. Scifres, Los Altos, both of Calif.

[73] Assignee: Xerox Corporation, Stamford, Conn.

[21] Appl. No.: 327,137

[22] Filed: Dec. 3, 1981

[51] Int. Cl.³ .................................................. H01J 5/16
[52] U.S. Cl. .............................. 250/237 G; 33/1 M; 33/125 A; 340/710
[58] Field of Search ........... 250/548, 221, 557, 237 G; 340/709, 710; 33/1 M, 125 A

[56] References Cited

U.S. PATENT DOCUMENTS

| | | |
|---|---|---|
| 3,304,434 | 2/1967 | Koster . |
| 3,496,364 | 2/1970 | Foskett et al. . |
| 3,524,067 | 8/1970 | West . |
| 3,541,541 | 11/1970 | Engelbart . |
| 3,835,464 | 9/1974 | Rider . |
| 3,892,963 | 7/1975 | Hawley et al. . |
| 3,987,685 | 10/1976 | Opocensky . |
| 4,114,034 | 9/1978 | Hunka . |
| 4,180,704 | 12/1979 | Pettit . |
| 4,302,109 | 11/1981 | Davies . |

Primary Examiner—David C. Nelms
Assistant Examiner—Darwin R. Hostetter
Attorney, Agent, or Firm—W. Douglas Carothers, Jr.

[57] ABSTRACT

An optical cursor control device or "optical mouse" is disclosed for use with an interactive, display oriented computer system to provide movement for a visible cursor from position to position on a display screen of such a system. The cursor control device provides an output indicative of the amount and direction of movement of the device relative to an orthogonal coordinate system. The device relies on a planar grid pattern comprising orthogonally positioned grid lines of uniform spacing, one line and spacing defining a grid period. Means is provided to illuminate at least a portion of the grid pattern. Sensor array means comprising optical transducers are provided for each orthogonal direction. Each optical transducer has an elongated radiation detecting area to receive radiation from an elongated radiation collecting area at the plane of said grid pattern. The length of the radiation collecting area of each transducer is equal to or greater than a grid period and the width of these areas is equal to or narrower than the width of one half of the grid period.

6 Claims, 11 Drawing Figures

OPTICAL CURSOR CONTROL DEVICE

BACKGROUND OF THE INVENTION

This invention relates to cursor control devices in particular to cursor control devices useful in interactive, display oriented computer systems wherein a display cursor is movable about the screen of the device by means of the cursor control device.

Over the past decade or so, different functional control devices for use with computer display systems have been developed along with the rapid development of such systems and so called "smart" display terminals. These devices have taken several forms, such as joy sticks, light pens, touch panels and hand held cursor control devices, commonly referred to as a "mouse". One of the most prevalent uses of these devices is to alter the display at selected locations by controlling a display cursor which is selectively moved over the display by means of the cursor control device.

The mouse, in particular, has become one of the most popular of the pointing devices used with interactive, display oriented computer systems, to control the visual cursor on the system display. The mouse tracks the movement of a user's hand as the user moves the mouse about on a work surface or pad usually next to the user's keyboard input to the system. Microswitches may be positioned on the top surface of the housing of the mouse to perform various functions in the system upon finger operation of a microswitch selected by the user. The mouse has recently become available in the office products market as a part of the 8010 Professional Workstation, developed, manufactured and distributed by Xerox Corporation.

Cursor research and development over this period of time has led many to conclude that the concept of the mouse is the preferred and best means for performing cursor function controls, some of the reasons being its adaptability for use in conjuction with a keyboard input of such systems from a human engineering standpoint and ease of display cursor movement with desired functions implemented by microswitches present on the mouse.

The "mouse" type of cursor control devices employed to date have been of electromechanical design. Examples of such devices may be found in U.S. Pat. Nos. 3,304,434; 3,541,541; 3,835,464; 3,892,963 and 3,987,685. The best known electromechanical "grandfather" mouse was developed at Standford Research Institute and is disclosed in U.S. Pat. No. 3,541,541. This mouse employs a pair of wheels that turn potentiometer shafts to encode X and Y motion into analog signals. Each wheel turns as the mouse is moved along its respective coordinate direction and slips sideways as the mouse is moved in an orthogonal direction. When the mouse is moved diagonally, both wheels turn and slip simultaneously. The design of this mouse led to the use of ball beatings as wheels and optical shaft encoders to generate a two bit quadrature signalling code, as disclosed in U.S. Pat. No. 3,892,963. The motion of a wheel caused a two bit output for a coordinate direction to form square waves in quadrature, with phase and frequency determining the direction and speed of travel. Each bit transition represented motion of one resolvable step which was employed to move the cursor on the display screen. Further development led to the employment of a ball or sphere instead of two wheels for more uniform tracking (U.S. Pat. Nos. 3,835,464 and 3,987,685). Internally, the sphere itself was a trackball with shafts turning against the ball and with commutation as shaft encoders or optical disc encoders, the latter being disclosed in U.S. Pat. No. 3,304,434.

While these mice have proved to be quite useful in performing display functions, they have not been outstandingly reliable, particularly over long periods of use. For example, the mechanical moving parts of the mouse, such as the balls and wheels, become dirty and slip on the work surface or pad, rather than provide continuous rolling action, or the commutators become dirty and skip.

Also, because of the precision and tolerances necessary for the mechanical moving parts and the number of parts involved, these mechanical mice have been expensive to fabricate.

The goal, therefore, is to design a mouse with no moving parts (excluding the microswitches) thereby eliminating the above mentioned mechanical disadvantages and providing a mouse with high reliability over long periods of time. One direction toward the goal of no moving parts is optics and optical detection of mouse tracking functions. The concept of optical tracking, i.e., optical detection of an optical image, such as a track, lines, bars or grating, is not new. Examples of such tracking utilizing one or more optical detectors are disclosed in U.S. Pat. Nos. 3,496,364; 3,524,067; 4,114,034 and 4,180,704. However, none of these optical tracking devices disclose optical tracking techniques suitable to perform the functions required in a mouse, i.e., they are not "smart" enough to provide multidirectional tracking indicative of direction of movement and the amount of that movement necessary for a display oriented computer system.

SUMMARY OF THE INVENTION

According to this invention, an optical cursor control device or "optical mouse" is disclosed for use with an interactive, display oriented computer system to provide movement for a visible cursor from position to position on a display screen of such a system. The cursor control device provides an output indicative of the amount and direction of movement of the device relative to an orthogonal coordinate system. The device relies on a planar grid pattern comprising orthogonally positioned grid lines of uniform spacing, one line and spacing defining a grid period. Means is provided to illuminate at least a portion of the grid pattern. Sensor array means comprising optical transducers are provided for each orthogonal direction. Each optical transducer has an elongated radiation detecting area to receive radiation from an elongated radiation collecting area at the plane of the grid pattern. The length of the radiation collecting area of each transducer is equal to or greater than a grid period and the width of these areas is equal to or narrower than the length of one half of a grid period.

In the preferred embodiment, there is a pair of optical transducers for each orthogonal direction. The elongated radiation collecting area of each transducer pair at the plane of the grid pattern being parallel and spatially related by a distance predetermined relative to the grid period, e.g., one quarter of the grid period, whereby the output of each transducer pair is indicative of the direction of the orthogonal coordinate being detected. Directional movement is sensed by relative movement of the transducer pairs in a direction transverse to the elongated extent of their radiation detecting areas.

The electrical output of the optical transducers provides quadrature signals indicative of the amount and direction of movement of the optical mouse relative to the grid pattern and, correspondingly, represent positional changes in the location of a visual cursor on a display screen of an interactive, display oriented computer system.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 7 illustrates a schematic plan view of the package and FIG. 8 illustrates a schematic side view of the package.

DESCRIPTION OF THE PREFERRED EMBODIMENT

Figure 1:
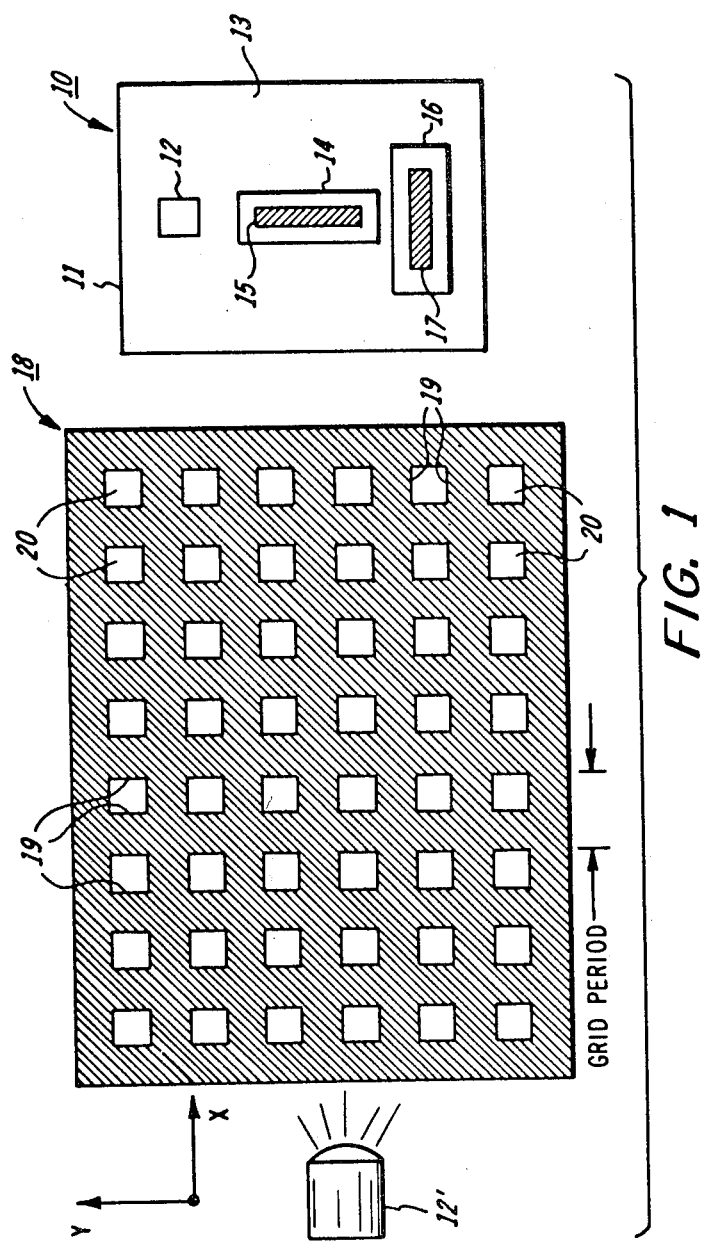
FIG. 1 is a schematic view of a planar grid pattern and an optical cursor control device having orthogonal transducers and illumination means in accordance with this invention.

FIG. 1 illustrates the primary component comprising the optical cursor control device 10 comprising this invention. The device 10 includes a source of illumination source 12, and sensor array means in the form of two orthogonally positioned optical transducers 14 and 16. These components are assembled in a package and supported in housing 11. Housing 11 is similar to the housing of the electro-mechanical mice now in use and disclosed in U.S. Pat. Nos. 3,541,541 and 3,835,464. These components are optically exposed relative to the bottom surface 13 of the housing 11. The bottom surface 13 of the optical cursor control device 10 is moved over the surface of a planar grid pattern 18 in a manner that illumination source 12 illuminates a portion of the grid pattern and radiation from the pattern is reflected and detected by the transducers 14 and 16.

The grid pattern 18 comprises a plurality of orthogonally arranged radiation absorbing lines 19 and alternate reflective spaces 20. The grid lines 19 and spaces 20 are of equal width. The width of one line 19 and one spacing 20 is one grid period. Lines 19 may be, for example, black lines while spaces 20 are white.

Transducers 14 and 16 have elongated apertures 15 and 17, respectively, that provide rectangular shaped radiation detecting areas. The transducers are positioned to be respectively sensitive to motion in orthogonal directions, such as, X and Y Cartesian coordinates. In FIG. 1, transducer 14 is sensitive to movement over the grid pattern 18 in the X direction while transducer 16 is sensitive to movement over the grid pattern 18 in the Y direction. This is because signal modulation of the reflected radiation from the grid pattern will be achieved as a transducer is moved across grid lines transversely relative to the elongated extent of the transducer aperture while little modulation is seen for motion in the orthogonal direction.

The transducers 14 and 16 may be of conventionally available photodetectors or optical sensors that provide an electrical output proportional to the radiation detected. Examples are silicon p-n junction diodes or Schottky barrier diodes. The illumination source 12 may be incandescent, LED or a diode laser. It is not mandatory that there be only one source 12 or that source 12 be housed with the transducer components in the device housing 11. The illumination source may be external of the cursor control device as indicated at 12'. The source 12' may be positioned in a manner to illuminate either the bottom or the top surface of the grid pattern 18 or may be made integral with a tablet upon which the grid pattern 18 is fixed, e.g., an illumination source embedded in a translucent plate comprising the tablet.

Figure 2:
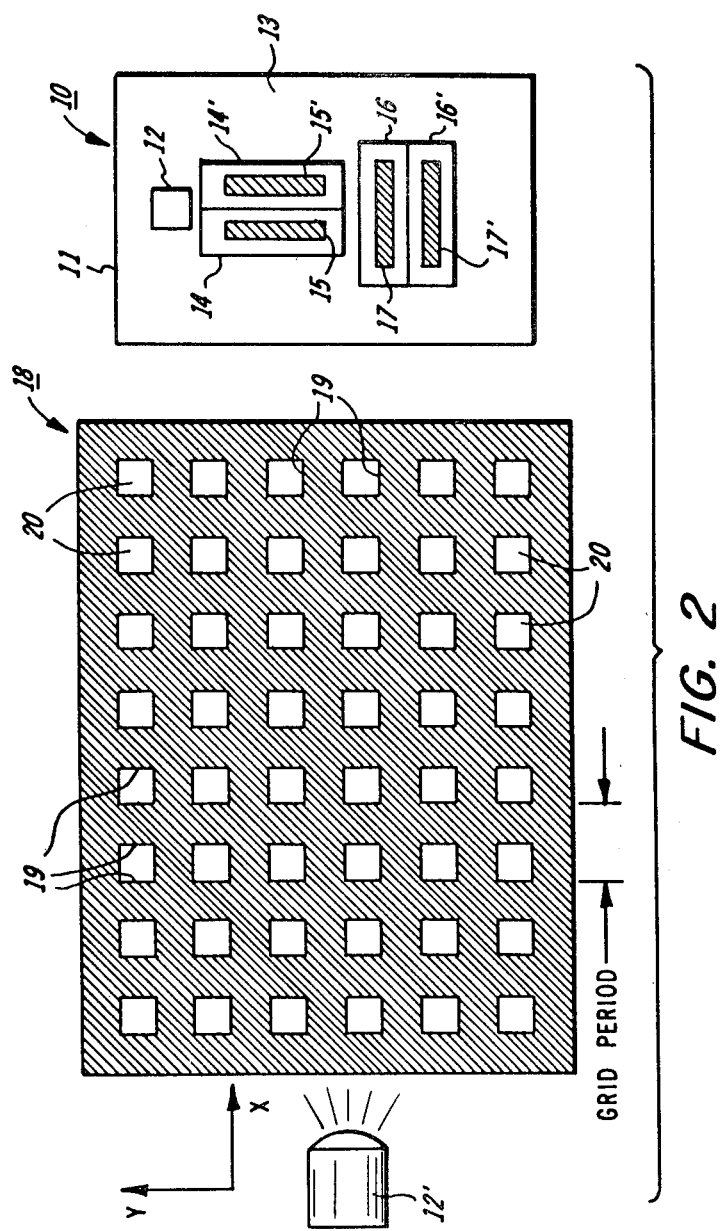
FIG. 2 is a schematic view of a planar grid pattern and an optical cursor control device having pairs of orthogonal transducers and illumination means in accordance with this invention.

While the arrangement in FIG. 1 is sensitive to movement in either the X or Y coordinates, there is no capability of sensing the direction of motion in a coordinate direction, i.e., whether movement is $-X$ or $+X$ or $-Y$ or $+Y$. Directional coordinate sensing can be achieved by employing pairs of transducers for each coordinate direction. This arrangement is illustrated in FIG. 2. FIG. 2 is the same as FIG. 1 except relative to the sensor array means wherein there are pairs of transducers 14 and 14' and 16 and 16' with transducer apertures 15 and 15' and 17 and 17', respectively.

Figure 3:
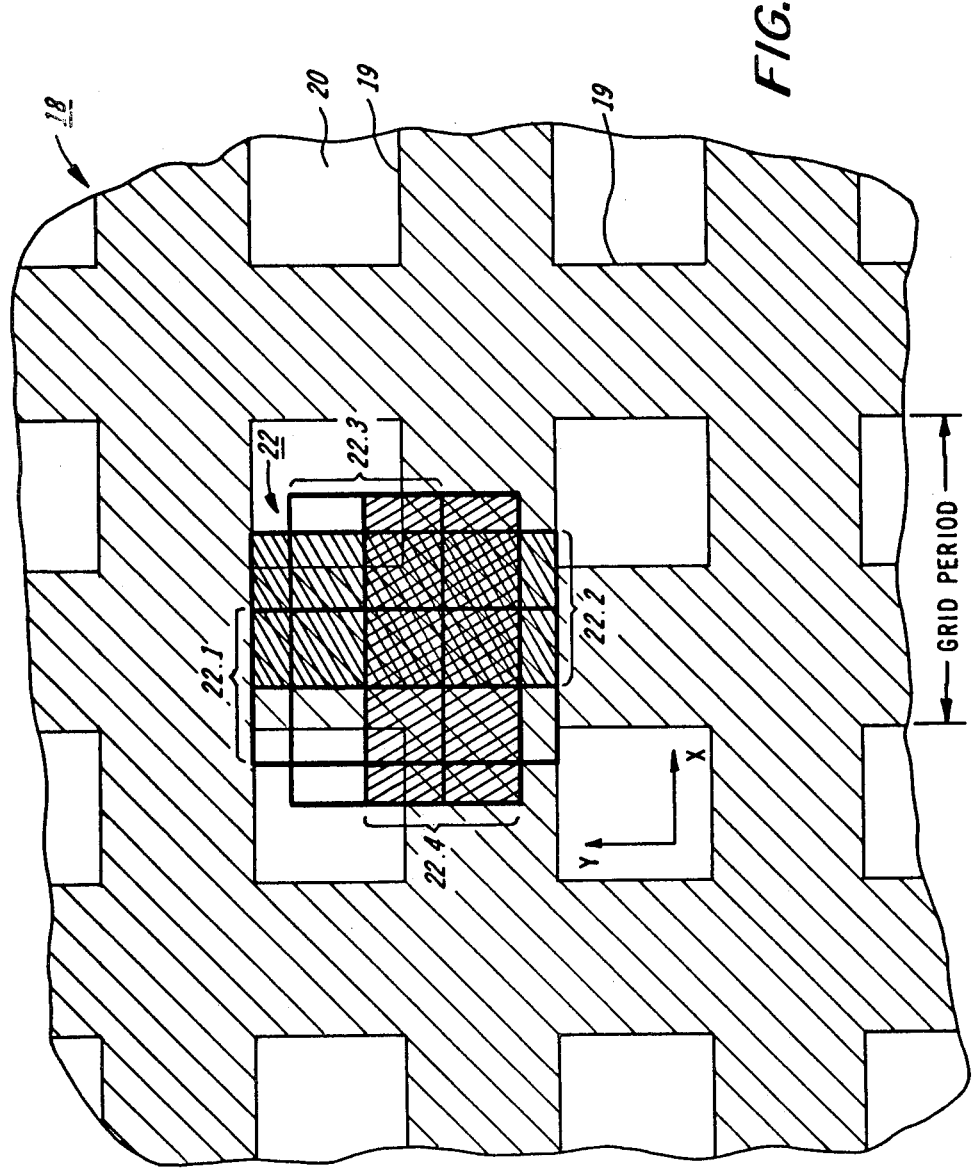
FIG. 3 is an enlarged view of a section of the planar grid pattern illustrating the radiation collecting area of the transducer pairs of FIG. 2 as superimposed on the grid pattern.

A common feature of the arrangements of both FIGS. 1 and 2 is that the radiation collecting areas of each of the transducers, as seen by the transducers at the plane of the grid pattern 18, is oblong or rectangular in shape and the length and width of these areas have a definite relationship with grid period. This relationship is illustrated in FIG. 3 for the transducer implementation of FIG. 2.

The radiation collecting areas 22 are four in number and represent the areas of radiation sensing at the plane of the grid pattern 18 as seen by the transducers 14 and 14' and 16 and 16'. Thus, for example, area 22.1 is the area sensed by transducer 14, area 22.2 by transducer 14', area 22.3 by transducer 16 and area 22.4 by transducer 16'. In all cases, the length of each radiation collecting areas 22 is equal to a grid period or greater in length by an integral number of grid periods and the width of each radiation collecting area 22 is equal to or narrower than the width of a grid line 19 or space 20, i.e., equal to or narrower than one half of a grid period. The pairs of radiation collecting areas 22.1 and 22.2 or 22.3 and 22.4 are separated by one quarter of a grid period, as illustrated in FIG. 3. For sensing motion in the X direction, the X radiation collecting areas 22.1 and 22.2 have a width in the X direction less than or equal to one half a grid period, providing high contrast signal modulation for motion in the X direction, and a height in the X direction equal to or an integral multiple of the grid period, providing no signal modulation for motion in the Y direction. The same, of course, is true relative to the Y radiation collecting areas 22.3 and 22.4 for motion in the Y direction.

Figure 4:
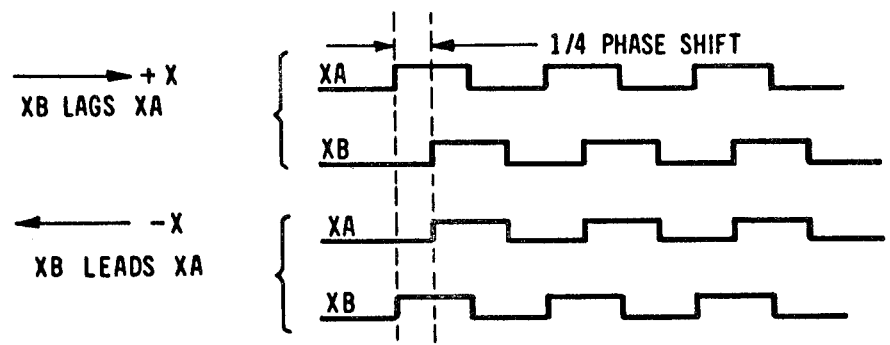
FIG. 4 is a pulse train representation of quadrature signal output of a pair of coordinate transducers of FIG. 2, indicative of the direction of motion along a particular orthogonal coordinate.

The output of transducers 14 and 14' and 16 and 16' are quadrature signals XA, XB, YA and YB which are employed in the same conventional manner as the quadrature signals produced with the electromechanical mouse available as part of the 8010 Professional Workstation, previously mentioned. These four output signals provide quadrature encoding indicative of movement in an X-Y coordinate system. An example of two of the four signals is shown in FIG. 4, which are signals XA and XB. The phase relationship of the signal pairs in either the X or Y direction is indicative of the direction of movement. The phase relationship shown in FIG. 4 is shown to be 90° but obviously this phase difference may be more or less than 90°. Each of these signals is a square pulse wave.

If signal XB from transducer 14 lags signal XA from transducer 14', then motion is in the +X direction. If signal XB leads signal XA, then motion is in the −X direction. By the same token, if the pulse train signal YA from transducer 16 is leading in time, the pulse train signal YB from transducer 16' movement is +Y. If YB is leading YA, movement is −Y.

FIG. 5 represents several examples of the source/transducer implementation of FIG. 2 to perform the cursor control function. In these implementations, an optical lens for focusing is not necessary. For purposes of simplicity, only arrangements for the Y coordinate direction are illustrated. The arrangements would be the same for the X coordinate direction. The preferred illumination source for these arrangements would be a diode laser or LED.

Figure 5A:
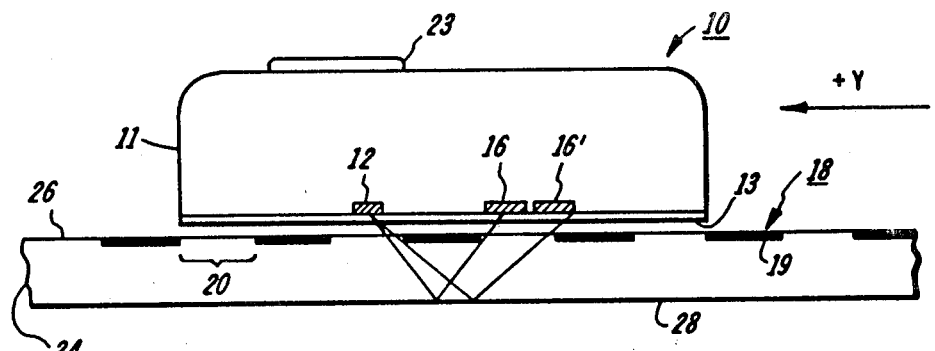
FIG. 5 illustrates four possible configurations for the cursor control device of this invention employing the implementation of FIG. 2.

In FIG. 5A the grid pattern 18 is formed on the top surface 26 of the transparent tablet 24. The bottom surface 28 of tablet 24 is specularly reflective. The transducers 16 and 16' and source 12 are disposed in the bottom surface 13 of the housing 11. A microswitch 23 is shown at the top of housing 11. Cursor control device 10, when moved in the Y direction over the tablet surface 26, will produce the quadrature signals YA and YB. The radiation collecting areas 22 of transducers 16 and 16' at the plane of the grid pattern 18 are such that the length of each area is equal to or greater than a grid period and the width of each area is equal to or narrower than one half of a grid period. This is true for all FIG. 5 examples.

Figure 5B:
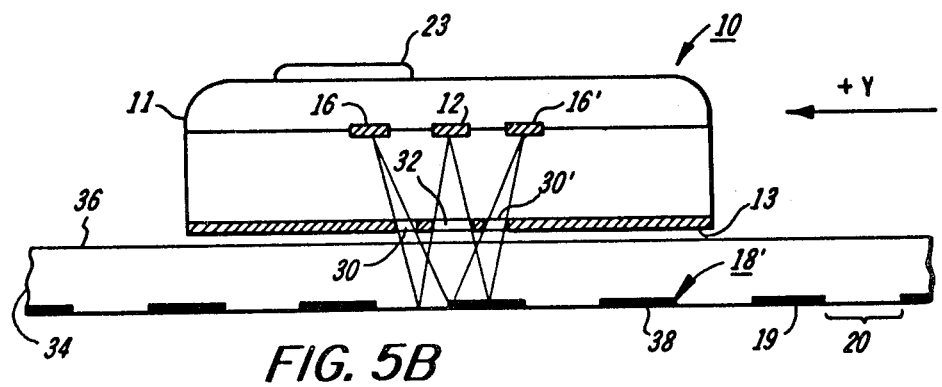

In FIG. 5B, the transducers 16 and 16' are disposed on either side of emitter 12. The bottom surface 13 of the cursor control device 10 is opaque and provided with apertures 30, 30' and 32. The tablet 34 is a diffuse tablet so that radiation entering the tablet through top surface 36 scatters in all directions. The bottom surface 38 of tablet 34 is provided with grid pattern 18. Radiation from emitter 12 through aperture 32 is scattered in tablet 34 and absorbed at grid lines 18. Transducers 16 and 16' respectively detect scattered light contrast through apertures 30 and 30' in the bottom surface 13. To be noted is that apertures 30 and 30' are representative of the radiation detecting apertures 15' and 17' and are of rectangular shape. The aperture 32 may be of larger size is dependent on the far field beam of emitter 12. However, the dimensions of aperture 32 are not technically governed by the grid line or space dimensions or the grid period.

Figure 5C:
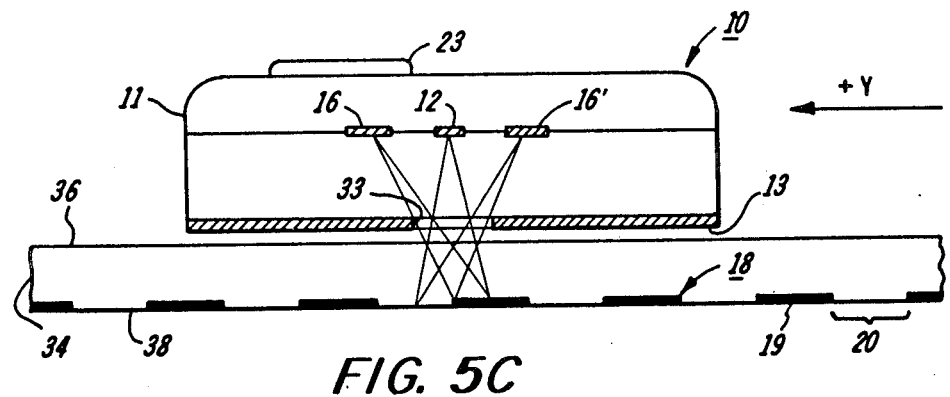

The example of FIG. 5C is the same as that of FIG. 3B, except that there is only one aperture 33 on the bottom surface 13 of the cursor control device 10 for the illumination source and detection functions.

Figure 5D:
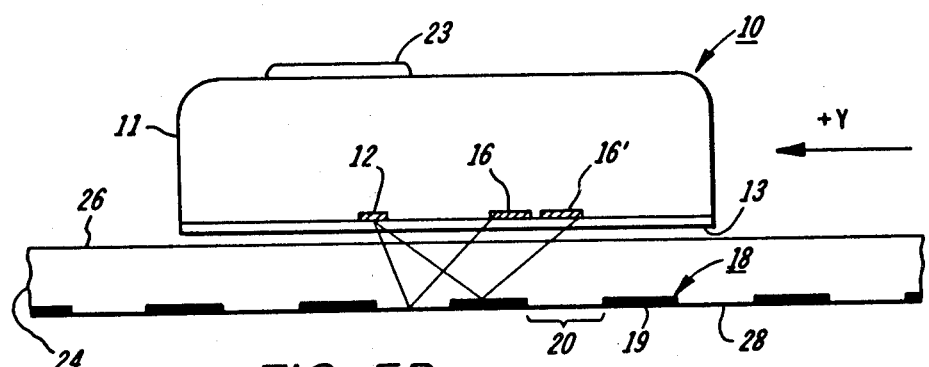

In FIG. 5D the example is similar to the example of FIG. 5A except the grid pattern 18 is fixed to the bottom surface 28 of the tablet 24. Surface 28 is specularly reflective and the top tablet surface 26 is transparent. The radiation collecting areas 22 of transducers 16 and 16' at the plane of grid pattern 18 are designed to have their lengths equal to or greater than a grid period and a width that is equal to or narrower than one half of a grid period.

Figure 6:
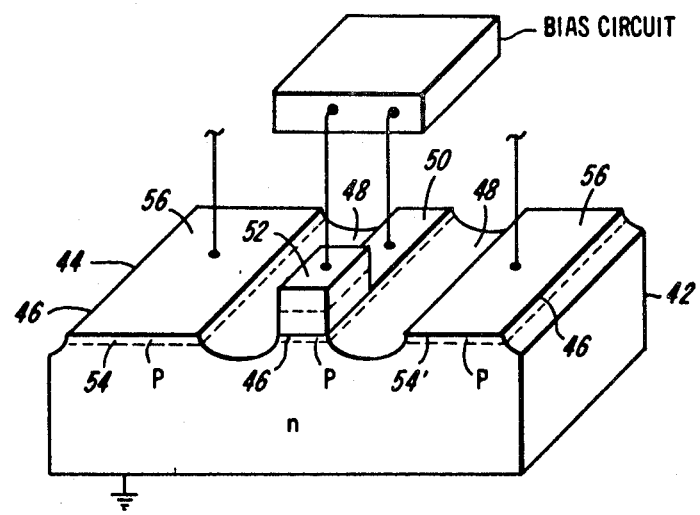
FIG. 6 illustrates an embodiment comprising an integrated semiconductor emitter/detector device that may be employed in the cursor control device of this invention.

FIG. 6 illustrates a semiconductor chip that may be employed for the detection tracking functions for each coordinate direction in the implementations illustrated in FIGS. 2-5. The structure comprises the silicon substrate 42 of n-type with a p-type diffused region 46 along its top surface 44. Channels 48 are etched into surface 44 forming a central mesa 50 and side mesas 56. An LED or diode laser 52 is mounted on mesa 50 and connected to an appropriate bias circuit. Side mesas 56 form p-n junction diodes 54 and 54' functioning as photodetectors. Schottky barrier detectors may be employed in lieu of p-n junction detectors.

In order to achieve large radiation collection areas for the detectors 54 and 54', doping of these regions should be low to provide low resistance, such as, 20 ohms-cm. Also, a back voltage bias may be applied to detectors 54 and 54' to enhance their sensitivity.

Figure 7:
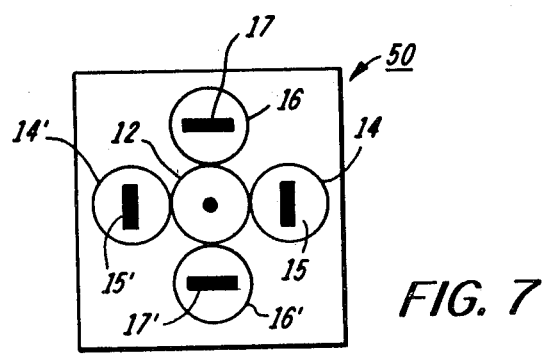
FIGS. 7 and 8 illustrate another embodiment comprising an emitter/detector device that may be employed as an integrated package in the cursor control device of this invention.
Figure 8:
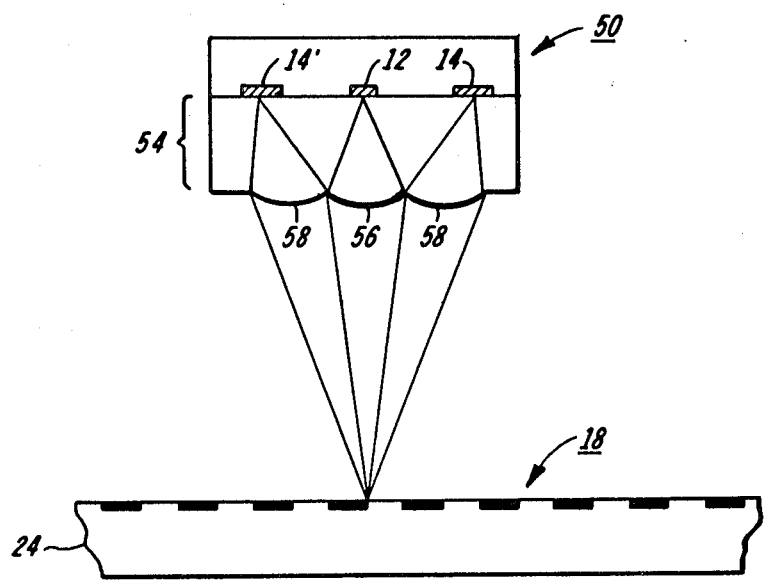

FIGS. 7 and 8 illustrate a four detector arrangement that may be employed for the detection tracking functions in the implementations illustrated in FIGS. 2-5. As shown in FIG. 7, the cursor control device 10 includes an integrated four detector package 50 comprising four transducers 14, 14', 16 and 16'. In the center of four detector 50 is an emitter 12, e.g., an LED. As shown in FIG. 8, a split plastic lens element 54 is molded onto the quad cell package 50 to enhance radiation collection received from the grid pattern tablet 24. One portion of the lens element 54 is employed to image the radiation from emitter 12 via lens 56 into a spot at the grid pattern 18 while the other portions of the element, i.e., lenses 58, image radiation collecting areas 22 at the grid pattern 18 onto the transducers 14 and 14'. There are also two orthogonally positioned lenses 58 for transducers 16 and 16'. By employing a molded quad lens element 54 integrated with package 50, a small spot of radiation can be obtained. If the grid pattern 18 on tablet 24 has a grid period of high spatial frequency, relative movement between package 50 as housed in device 10 and tablet 24 will produce quadrature signals of high modulation frequency.

The advantage of the integrated package 50 is that its dimensions and alignment sensitivities are very coarse and can be easily fabricated as a component for an optical mouse that is rugged in construction, reliable and cost effective.

In summary, the radiation collecting areas sensed by each transducer are rectangular in shape and have a length in the direction orthogonal to the coordinate direction being tracked equal to or an integral multiple of the grid period of the grid pattern 18. The width of the sensed area in the coordinate direction being tracked is equal to or less than one half of a grid period, so that good signal modulation is achieved as the cursor control device 10, for example, with package 50 is moved relative to grid pattern 18. The two coordinate transducers in each of the orthogonal directions have radiation collecting areas at the grid pattern plane that are one quarter of a grid spacing apart to provide in-phase electrical quadrature signals for tracking and monitoring by an interactive, display oriented computer system.

Although the implementation of the cursor control device 10 disclosed would be somewhat sensitive to rotational orientation, requiring the user to substantially align and maintain fair alignment of the transducer rectangular apertures (and thus their radiation collecting areas at the grid pattern plane) relative to the orthogonal grid pattern, this is not viewed as a significant user problem since the user would tend to perform such a function unconsciously after little use of the device 10 and, further, the accuracy of such alignment need only be within about ±20 degrees.

While the invention has been described in conjunction with specific embodiments, it is evident that many alternatives, modifications and variations will be apparent to those skilled in the art in light of the foregoing description. Accordingly, it is intended to embrace all such alternatives, modifications, and variations as fall within the spirit and scope of the appended claims.

What is claimed is:

1. In a cursor control device to provide an output indicative of the amount and direction of movement of the device relative to an orthogonal coordinate system including
    a planar grid pattern comprising orthogonally positioned grid lines of uniform spacing, a line and spacing therebetween defining a grid period,
    means to illuminate at least a portion of said grid portion,
    a housing,
    sensor array means mounted in said housing to receive and detect radiation from said grid pattern, said array means comprising optical transducer means for each orthogonal direction, each of said transducer means having an elongated radiation detecting area to receive radiation from an elongated radiation collecting area at the plane of said grid pattern, the length of each of said transducer means radiation collecting area being equal to or greater than a grid period and the width of each of said transducer means radiation collecting area being equal to or narrower than one half of said grid period.

2. The cursor control device of claim 1 wherein there is a pair of optical transducer means for each orthogonal direction, the elongated radiation collecting areas of each pair at said grid pattern being parallel and spatially related by a distance predetermined relative to said grid period whereby output of each pair is indicative of the direction of the orthogonal coordinate being detected.

3. The cursor control device of claim 2 wherein said distance is selected to be one quarter of said grid period.

4. The cursor control device of claim 1 wherein there is means to move said housing relative to said grid pattern.

5. The cursor control device of any one of the claims 1 through 4 wherein said illuminating means consists of either an incandescent, LED or laser light source.

6. The cursor control device of any one of the claims 1 through 4 wherein said radiation collecting area is created by an aperture disposed in the optical path between said transducer means and said radiation collecting area.

* * * * *